United States Patent
Chin et al.

(10) Patent No.: US 9,690,348 B2
(45) Date of Patent: Jun. 27, 2017

(54) CONTACTLESS TURNING ON OF IOT DEVICES USING MOBILE PHONE CAMERA LIGHT SOURCE

(71) Applicants: Ting-Yueh Chin, Taichung (TW); Su-Teng Kuo, New Taipei (TW)

(72) Inventors: Ting-Yueh Chin, Taichung (TW); Su-Teng Kuo, New Taipei (TW)

( * ) Notice: Subject to any disclaimer, the term of this patent is extended or adjusted under 35 U.S.C. 154(b) by 0 days.

(21) Appl. No.: 14/953,283

(22) Filed: Nov. 27, 2015

(65) Prior Publication Data

US 2017/0153681 A1 Jun. 1, 2017

(51) Int. Cl.
| | |
|---|---|
| *G06F 1/00* | (2006.01) |
| *H04B 5/00* | (2006.01) |
| *G06F 1/28* | (2006.01) |
| *H04W 76/02* | (2009.01) |
| *G05F 1/625* | (2006.01) |

(52) U.S. Cl.
CPC .............. *G06F 1/28* (2013.01); *G05F 1/625* (2013.01); *H04W 76/02* (2013.01)

(58) Field of Classification Search
CPC .................................................. G06F 1/3203
USPC ........................................................ 713/310
See application file for complete search history.

(56) References Cited

U.S. PATENT DOCUMENTS

| | | | | |
|---|---|---|---|---|
| 9,009,230 | B1* | 4/2015 | Matthieu | H04L 67/12 |
| | | | | 709/204 |
| 9,094,407 | B1* | 7/2015 | Matthieu | H04L 63/10 |
| 9,210,534 | B1* | 12/2015 | Matthieu | H04W 4/005 |
| 9,369,008 | B2* | 6/2016 | Ollikainen | H02J 17/00 |
| 2013/0128627 | A1* | 5/2013 | Moon | H02M 3/33507 |
| | | | | 363/21.17 |
| 2015/0019714 | A1* | 1/2015 | Shaashua | H04L 67/24 |
| | | | | 709/224 |
| 2015/0121470 | A1* | 4/2015 | Rongo | H04L 41/0813 |
| | | | | 726/4 |
| 2015/0347114 | A1* | 12/2015 | Yoon | G06F 8/61 |
| | | | | 235/375 |
| 2016/0248847 | A1* | 8/2016 | Saxena | H04L 67/18 |

* cited by examiner

*Primary Examiner* — Suresh Suryawanshi
(74) *Attorney, Agent, or Firm* — Ding Yu Tan

(57) ABSTRACT

Method and system for turning on an IoT device directly in a contactless manner using a mobile phone with a camera light source and an app is disclosed. A photo sensor unit is provided on top of the IoT device for converting the incident light from mobile phone into authorized and authenticated power-on switching command to the IoT device. The photo sensor unit can be a first photosensitive circuit, a second photosensitive circuit, or a third photosensitive circuit, which includes a photodiode, a photo resistor, and an amorphous silicon solar cell, respectively. The photo sensor unit is coupled to a power-on circuit of the IoT device, and used for detecting an intensity of incident light and assessing whether a voltage difference produced by the incident light exceeds a power-up voltage difference threshold value, and if so, awaking the IoT device to be power-on, otherwise, maintaining the IoT device to stay powered off.

9 Claims, 5 Drawing Sheets

CONTACTLESS TURNING ON OF IOT DEVICES USING MOBILE PHONE CAMERA LIGHT SOURCE

FIELD OF THE INVENTION

The present invention generally relates to a method and system for turning on of a internet-of-things (IoT) device without direct physical contact thereof by using a mobile phone and, more particularly, to a method and system for turning on or turning off of an IoT device directly using a mobile phone camera light source and an app running on the mobile phone.

BACKGROUND OF THE INVENTION

Nowdays, there are more and more instances and adoptions of internet-of-things (IoT) devices for use in our everyday lives. The data gathered in real time from these IoT devices will revolutionize many industries and fields. Through data connections and interactions of billions and billions of these IoT devices, many creative usages can be brought about to everyone. Meanwhile, due to the rapid falling of hard ware costs related to launching new IoT scenarios and applications, such as microchips, GPS sensors, motion sensors, together with increased advancements in software technologies, and coinciding with massive increases in global smartphone utilization, it seems that IoT explosion is right on the horizon. Meanwhile, advanced cellular networks around the world using 4G or LTE mobile telecommunication technologies have enabled significant developments in IoT solutions as being viable profitable endeavors and combined with lowered costs and greater scalability and flexibility of data storage cloud solutions have also help to expand the reach of IoT adoptions. According to estimates from McKinsey Global institute, the potential estimated economic impact is estimated to be as much as US $11.1 trillion per year by 2025.

However, upon the eventual IoT proliferation becoming commonplace and of reality, it seem that it would be rather a tedious task for an end user to have to physically interact with each of the IoT devices in order to turn it on or off. Apart from the convenience aspect of physically turning on or off of IoT devices by users, there is also the added issue relating to hygiene, since touching the on/off pad of the IoT can also include the inadvertent picking up of germs and bacteria from previous users. Meanwhile, sometimes the IoT devices may be located in certain harder to access locations, such as for example, a smart security IoT device mounted on a 3 meter high ceiling, or a smart camera type IoT device externally installed on a 13 meter utility pole, which means that it would be difficult for a user to turn on such hard to reach IoT devices. Although it could be possible to attempt to initiate direct wireless communication to each IoT device by the user using a smart phone and wireless internet connection to reach the management system of the IoT device, however, due to fact that IoT devices lacked standardized protocols and are fragmented in implementation technologies coupled with the difficult of not knowing sufficient IoT device setup information ahead of time, thus each user may not be able to gain full access of an IoT device owned and operated by various entities without spending significant of time figuring it out.

Therefore, there is a need in providing a method and system for allowing an end user to turn on or turn off an IoT device in a contactless manner directly using a mobile phone camera light source and an app running on the mobile phone.

SUMMARY OF THE INVENTION

An object of present invention is provide a method for an end user to turn on an IoT device in a contactless manner while the end user is using an app communicating with the IoT device, so as to allow a seamless transition between various tasks for the IoT device.

Another object of present invention is to enable an IoT device to remain in a power saving off-mode without requiring to proactively broadcasting detection signals to reach nearby wireless devices, but yet still able to be turned on or off remotely or contactless via a mobile phone.

Another object of present invention is to provide a contactless IoT device power-on system using a mobile phone equipped with a camera light source, an IoT device, an app configured on the mobile phone for managing communication tasks between the mobile phone and the IoT device, and a photo sensor unit which includes a photosensitive circuit mounted on the IoT device.

Another object of present invention is to prolong built-in battery life of an IoT device by turning off the IoT device during extended non-usage periods.

Another object of present invention is to facilitate the turning on and off of the IoT device without necessitating any extra devices or costs associated.

One advantage offered by embodiments of present invention to an end user of an APP on a mobile device is the capability of turning on and/or turning off one or more IoT devices in a convenient contactless manner.

Another advantage achievable by embodiments of present invention that can be realized is that an IoT device which is installed in harder-to-reach locations up to 2 meters away can still be turned on or off in a convenient contactless manner by the end user using the mobile phone.

Another advantage achievable by embodiments of present invention is that implementation flexibility is available to a wide range of IoT device configurations, such as for example, a conventional IoT device combined with an aftermarket IoT accessory unit which includes a light sensor module, an Integration of an IoT device under new development with a photosensitive circuit according to embodiment of present invention, or adaption of an IoT device that has a built-in light sensor and a built-in low-power comparator therein.

Another advantage achievable by embodiments of present invention is based on close proximity of the distance between the smart phone and the smart doorlock being around 50 mm during the contactless turning on process of the IoT device, security can be enhanced since unscrupulous bystanders would not be able to see what exactly has transpired between the smart phone and the smart doorlock, i.e. exactly how many times the camera light units has been flashing, and thus unable to crack the smart doorlock.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of the embodiments of this invention are presented herein for purpose of illustration and description only. It is not intended to be exhaustive or to be limited to the precise form disclosed.

Figure 1:
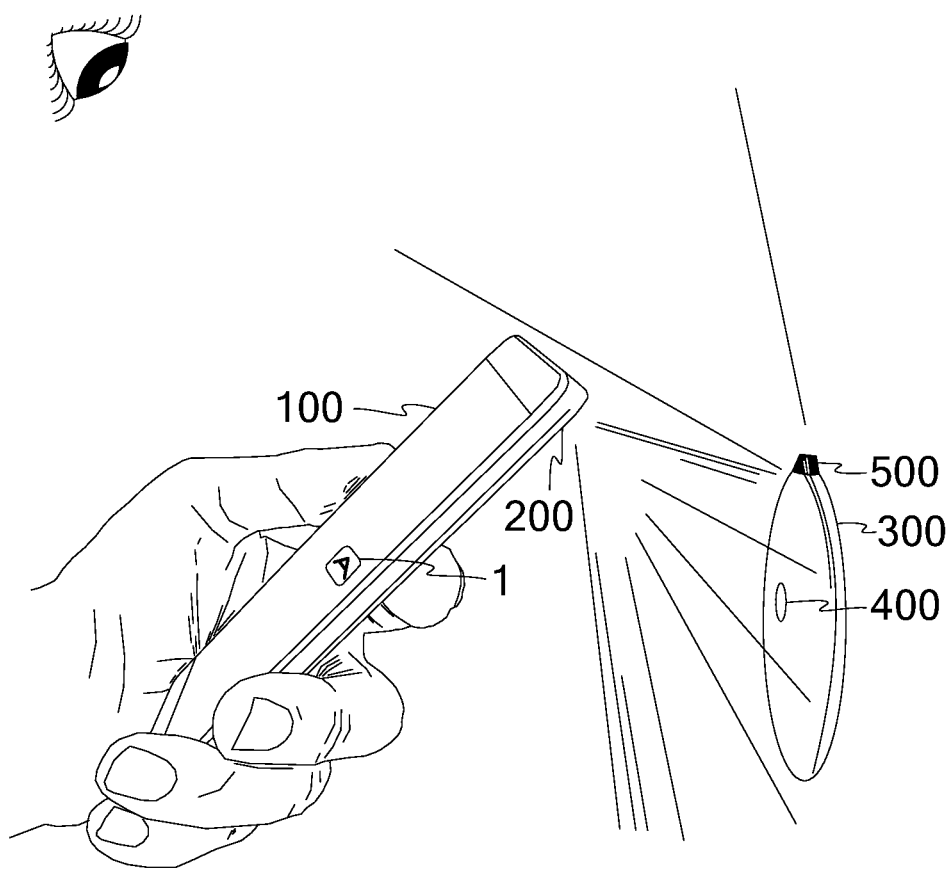
FIG. 1 shows a conceptual illustrative diagram of a contactless IoT device power-on system according to an embodiment of present invention.

As shown in FIG. 1, a contactless IoT device power-on system of an embodiment of present invention includes a mobile phone 100 equipped with wireless internet connection, an app 1, and a camera light source 200, an IoT device 300, the app 1 is configured on the mobile phone 100 for managing communication tasks between the mobile phone 100 and the IoT device 300, and a photo sensor unit 400 which includes a photosensitive circuit (not shown) mounted on the IoT device 300. In the illustrated embodiment of FIG. 1, the photo sensor unit 400 can include any one of the following photosensitive circuits, namely, a first photosensitive circuit 70, a second photosensitive circuit 80, or a third photosensitive circuit 90, as further shown in FIGS. 2A, 2B, and 2C. The IoT device 300 is an internet-of-things device, which includes the internetworking of physical devices (commonly also referred to as "connected devices" and "smart devices") and other items that are embedded with electronics, software, sensors, actuators, and network connectivity that enable these objects to collect and exchange data.

Figure 2A:
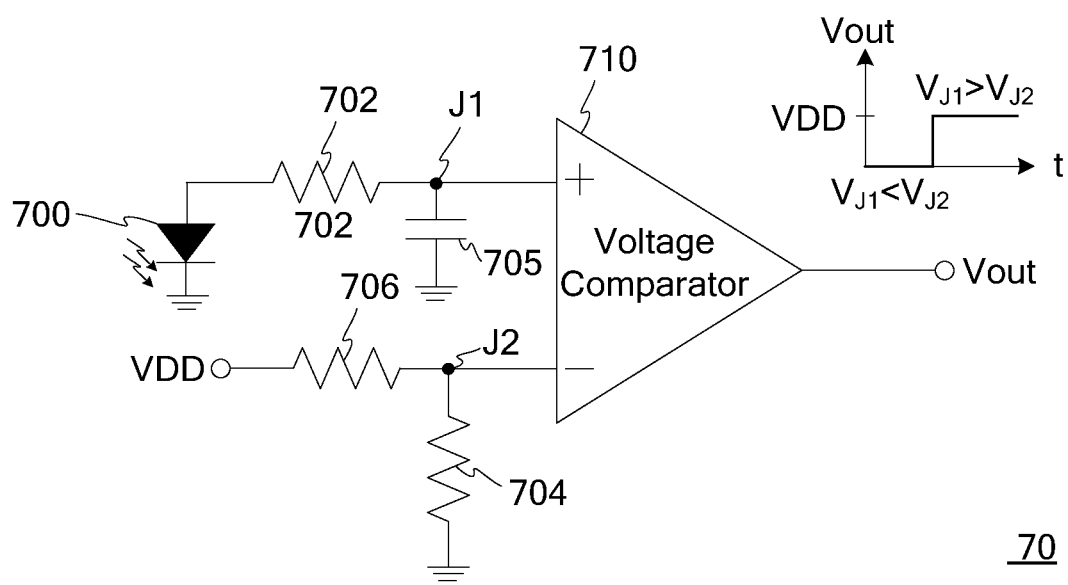
FIG. 2A shows a first photosensitive circuit of a photo sensor unit according to the embodiment of present invention.

As shown in FIG. 2A, the first photosensitive circuit 70 includes a photodiode 700, which through voltage differential thereof is used for detecting the incident light intensity, since the intensity of incident light dictates the width of the depletion region of the photodiode 700 thereby determining the voltage difference across thereof. The photodiode 700 is directly connected to a resistor 702 at an anode thereof, the resistor 702 is connected to the positive input of a voltage comparator 710. The cathode of the photodiode 700 is coupled to ground. The negative input of the voltage comparator 710 is connected to a resistor 704, which in turn is coupled to ground. In addition, the negative input of the voltage comparator 710 is also connected to a resistor 706, which in turn is coupled to VDD. A junction J1 is formed between one end of a capacitor 705, the resistor 702 and the positive input of the voltage comparator 710. A junction J2 is formed between the resistor 704, a resistor 706, and the negative input of the voltage comparator 710. An output of the voltage comparator 710 includes a digital voltage output Vout. An incident light from a mobile phone camera light source 200 can be generated and illuminated onto the photodiode 700, upon which the higher the intensity of the incident light, leads to a larger voltage difference at the two ends of the photodiode 700, thus the inclusion of the voltage comparator 710 provides the detection of the voltage difference amount to detect whether the required power-up voltage difference threshold of the turned-off IoT device has been met, where typically the voltage difference threshold is about 0.25 volts at a distance of 50 mm between the mobile phone camera light source 200 and the photodiode 700. Upon exceeding the voltage difference threshold as detected by the voltage comparator 710 by the light illuminated from the mobile phone camera light source 200 directly at the photodiode 700, the IoT device 300 is awaken and powered on. The first photosensitive circuit 70 requires to have a voltage comparator 710 of a lower power consumption of <0.5 uA and a resistive voltage divider circuit (<1 uA), so that the overall current consumption thereof is less than about 1.5 uA. In the illustrated embodiment of FIG. 2A, the resistor 702 is of 620 K ohm ($\Omega$), the capacitor 705 is 100 nF, the resistor 702 and the capacitor 705 is the first-order RC-filter for filtering the abrupt light signal from the photo sensor unit 400. The resistance of the resistor 706 is 4.7 M$\Omega$, and the resistor 704 is 620 K$\Omega$. Meanwhile, VDD is 3 v.

Figure 2B:
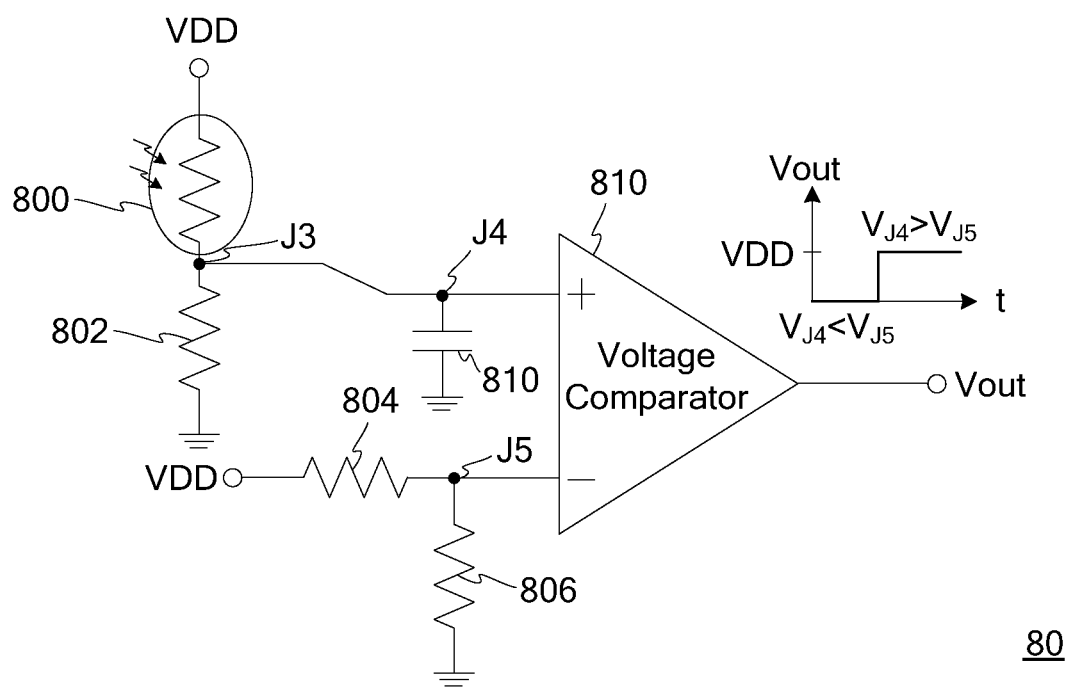
FIG. 2B shows a second photosensitive circuit of a photo sensor unit according to the embodiment of present invention.

An alternative version of the photo sensor unit 400 can be provided by the second photosensitive circuit 80. As shown in FIG. 2B, the second photosensitive circuit 80 includes a photo resistor 800, in which the equivalent resistance at two ends thereof can be used to determine the intensity of the incident light. However, since the photo resistor 800 requires a supply current to be present to produce a voltage difference, thus, there is a need to provide some quiescent current or ground current, in order to trigger response to light sensing. In the second photosensitive circuit 80, the photo resistor 800 is coupled to VDD and a resistor 802 at each end thereof. The resistor 802 is coupled to ground. A junction J3 is formed between the photo resistor 800, the resistor 802, and a junction J4. The junction J4 is formed between the junction J3, a capacitor 805 and a positive input of a voltage comparator 810. A junction J5 is formed between a resistor 804, a resistor 806, and the negative input of the voltage comparator 810. The resistor 804 is coupled to VDD at other end thereof. Meanwhile, the resistor 806 is coupled to ground at other end thereof. An output of the voltage comparator 810 includes a digital voltage output Vout. In the illustrated embodiment of FIG. 2B, the photo resistor 800 is between 0.5 K$\Omega$ (for the strongest light source brightness) to 50 k$\Omega$ (for the darkest), the resistor 802 is 500 K$\Omega$, the resistor 806 is 4.7 M$\Omega$, the resistor 804 is 10 K$\Omega$, and the capacitor 810 is 100 nF.

Figure 2C:
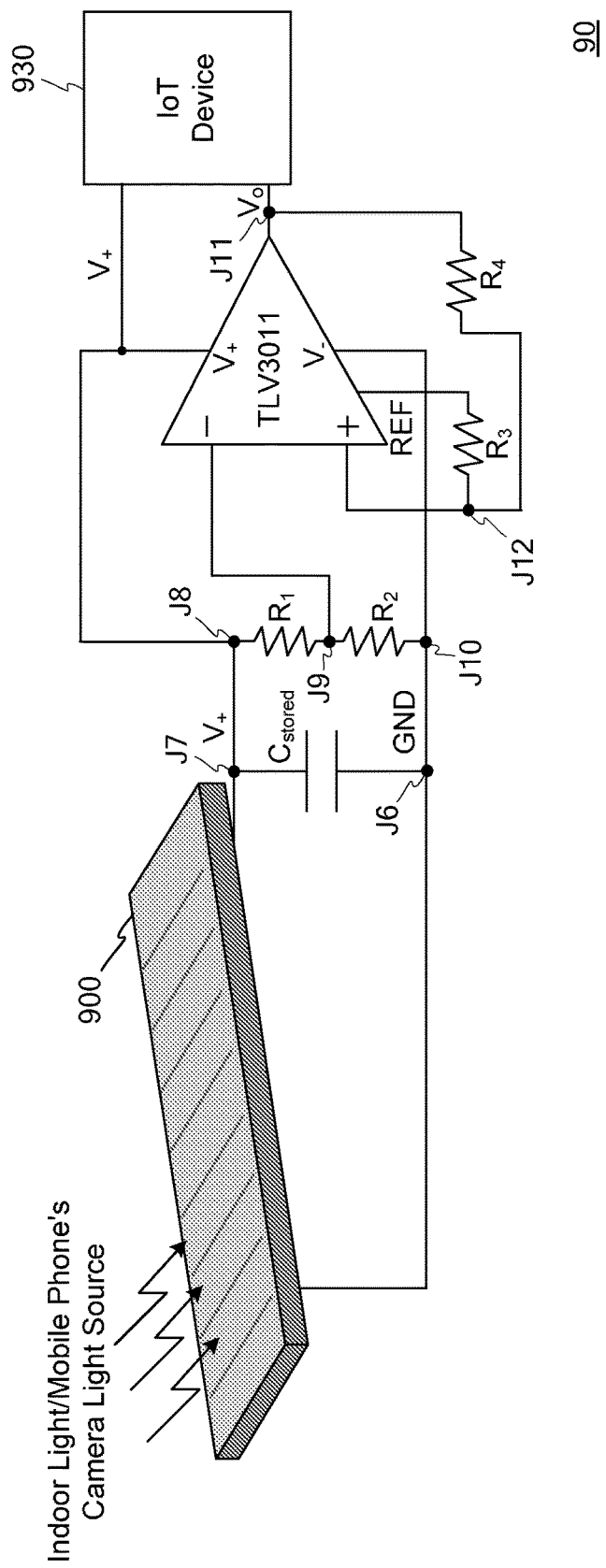
FIG. 2C shows a third photosensitive circuit of a photo sensor unit according to the embodiment of present invention.

Another alternative version of the photo sensor unit 400 can be provided by the third photosensitive circuit 90, as shown in FIG. 2C, in which the third photosensitive circuit 90 includes an amorphous silicon solar cell 900 connected to a junction J6 at a positive terminal thereof. The junction J6 is connected to a capacitor $C_{stored}$ and a junction J7. The junction J7 is also coupled to a resistor R1 and a Junction J8. The capacitor $C_{stored}$ is coupled to ground at one end thereof. The amorphous silicon solar cell 900 is connected to ground at a negative terminal thereof. A junction J9 is formed between the resistor R1, a resistor R2, and a negative input of a voltage comparator 910. A junction J10 is formed between the resistor R2, ground and a negative supply voltage V− of the voltage comparator 910. The junction J8 is coupled to a voltage input to an IoT device 930 and to a positive supply voltage V+ of the voltage comparator 910. A junction J11 is formed between the voltage output of the IoT device 930, the digital voltage output Vout of the voltage comparator 910, and a resistor R4. The resistor R4 is coupled to a Junction J12. The junction J12 is formed between the resistor R4, a resistor R3, and a positive input of the voltage comparator 910. Another end of the resistor R3 is coupled to a reference voltage REF of the voltage comparator 910. The voltage comparator 910 can be a Texas Instrument® model no. TLV3011 comparator, which is a low-power, open-drain output comparator with voltage reference and has a reference voltage REF being an integrated voltage reference of 1.242 v. The third photosensitive circuit 90 is realized through the amorphous silicon solar cell 900 for generating an amount of electrical energy for the IoT device 930, so that no battery is needed for use by the IoT device 930 for turning on or turning off thereof directly using a mobile phone camera light source 200. Because powering up of the IoT device 930 usually requires a larger amount of energy, so therefore the capacitor $C_{stored}$ is integrated as part of the circuit design of the third photosensitive circuit 90, so that a set amount of electrical energy can be stored by the capacitor $C_{stored}$ before being discharged to the IoT device 930. Because comparator inputs have no noise immunity within the range of specified offset voltage (±12 mV). For noisy input signals, the comparator output may display multiple switching as input signals move through the switching threshold. The typical comparator threshold of the TLV3011 voltage comparator 930 is ±0.5 mV. Thus, to prevent multiple switching within the comparator threshold of the voltage comparator 910, an external hysteresis is added by connecting a small amount of feedback to the positive input, as shown by the circuit design involving the resistor R3 and the resistor R4, respectively, in the illustrated embodiment. Hysteresis, is introduced and described by the following equation:

$$V_{HYST} = \frac{V+ \times R_3}{R_3 + R_4} \quad [1]$$

In the illustrated embodiment of FIG. 2C, the resistor R1 is 250KΩ, the resistor R2 is 600KΩ, the resistor R3 is 100KΩ, the resistor R4 is 560KΩ, the capacitor Cstored is between 470 uF to 2000 uF (capacitance value depends on power on energy consuming from the IoT device 930)

Figure 3:
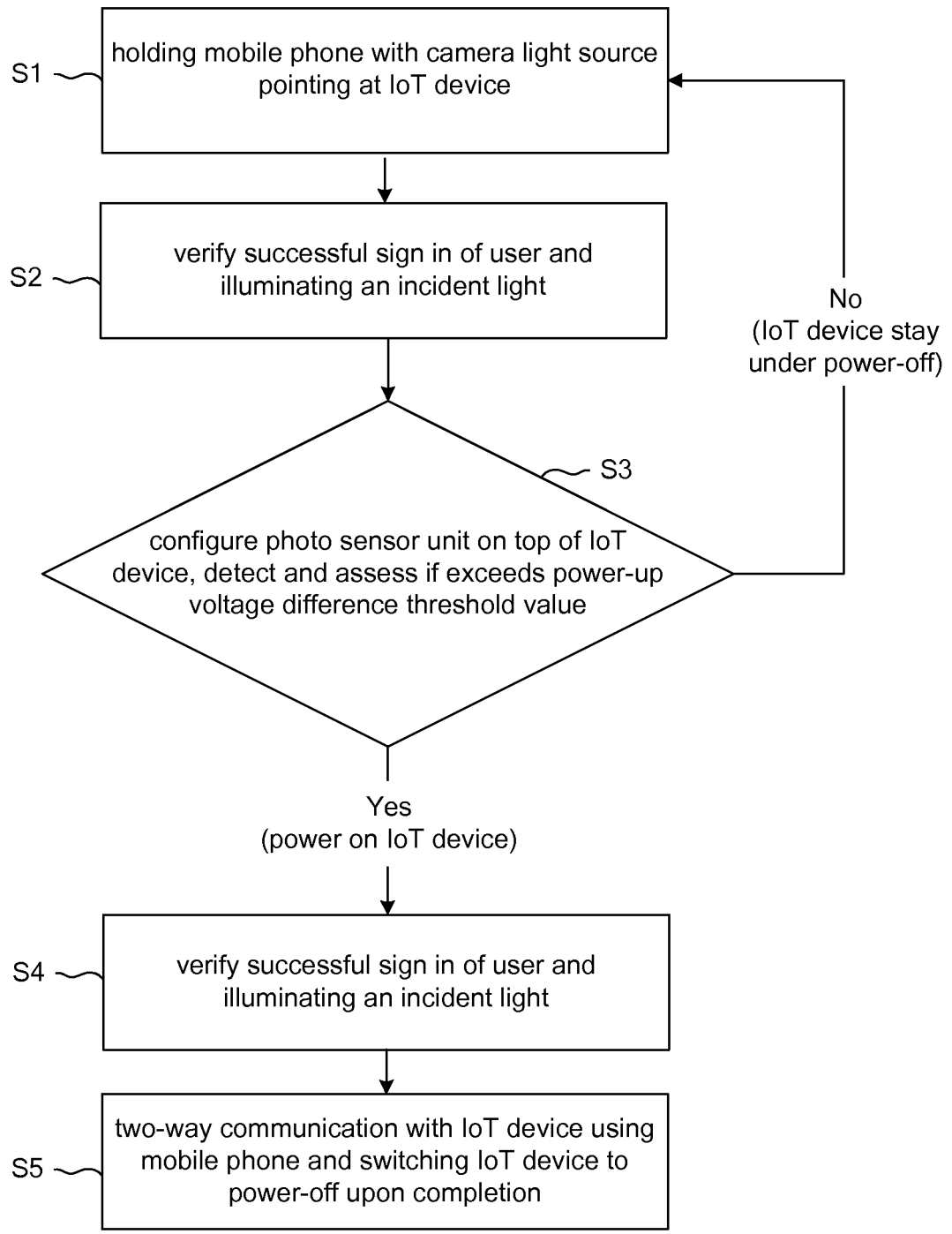
FIG. 3 shows a flow chart of a method for contactless turning on of an IoT device using a mobile phone according to the embodiment of present invention.

By using the contactless IoT device power-on system and any one of the photo sensor unit 400 thereof as exemplified by the first photosensitive circuit 70, the second photosensitive circuit 80, or the third photosensitive circuit 90, a method for turning on an IoT device 300 in a contactless manner using a mobile phone 100 (configured with a camera light source 200 and an app configured for interacting with the IoT device 300 therein which is running on the mobile phone 100), is provided which include the following steps as shown in FIG. 3: In step S1, an end user holds a mobile phone 100 equipped with a camera light source 200 thereon, with the camera light source 200 directly pointing at an IoT device 300, and activates the app configured for interacting with the IoT device 300 residing on the mobile phone 100. In step S2, the app verifies successful sign in of the end user and then power on a camera light source 200 of the mobile phone 100 for illuminating a bright light. In addition, the app reminds the end user to direct the illuminating light toward the IoT device 300. In step S3, a photo sensor unit 400 is configured to be coupled to a power-on circuit of the IoT device 300 and disposed on a top surface of the IoT device 300, so as to be able to trigger power-on of the IoT device 300 upon capturing of the illuminating light from the camera light source 200 of the mobile phone 100. The intensity of the light illuminated upon the photo sensor unit 400 is detected and assessed to see if a voltage difference that is proportional to the incident light intensity exceeds the power-up voltage difference threshold value, and if so, the IoT device 300 is awaken to be power-on, otherwise, the IoT device 300 would remain powered off. Upon powered on of the IoT device 300, the IoT device 300 can start performing wireless communication under for example, WiFi wireless internet connection, Bluetooth, Bluetooth low energy (BLE), Zigbee, etc. Two-way wireless communication including handshake operations can be performed between the IoT device 300 and the mobile phone 100 via the app, and the upon tearing down of communication sessions between the mobile phone 300 and the IoT device 300, the camera light source 200 of the mobile phone 100 can be flashing or blinking a set number of times to contactlessly instructing the IoT device 300 to change to the powered-off or hibernating state. In step S4, optionally, an indicator light 500 disposed on the IoT device or disposed along with the photo sensor unit 400 can be blinking for indicating successful powering-on of the IoT device 300 using the mobile phone 100 via the camera light source 200 thereon. In step S5, the mobile phone 100 can initiate direct wireless two-way communication with the IoT device 300 via the app therein. Upon completion of various tasks and updates involving the IoT device 300 using the app on the mobile phone 100, the IoT device 300 can be automatically be switched into a power-off or hibernate state, awaiting future subsequent power-on session.

The illustrated method for turning on the IoT device directly using a mobile phone as described according to the embodiment of present invention, can be adapted for usage in an usage scenario such as in a smart doorlock system, where conventional smart doorlocks are usually outfitted with an internal battery, which is usually operating in standby mode to conserve power. However, the smart doorlock as being considered as an IoT device with wireless communication capability, is able to utilize the method according to the embodiment present invention, to effectively power-on the smart doorlock, using a smart phone with the smart phone camera light source in a contactless or remote manner, upon which an electronic key certificate of the smart doorlock can be then transmitted from the mobile phone to the smart doorlock via a common commercial-available wireless communication schemes, such as BLE; later, upon successful authentication of the electronic key certificate sent from the mobile phone by the smart doorlock, the smart doorlock can then be granted permission to further perform door opening function. Based on this usage scenario, convenience can be realized by the end user for not having to physically touch any buttons of the smart doorlock, as well as power savings can be accomplished by having the smart doorlock operating in a totally powered-off state, rather than in standby mode where a small amount of power is used. Another advantage is that due to the necessity of having close proximity of the distance between the smart phone and the smart doorlock being around 50 mm during the contactless turning on process of the IoT device, security can be enhanced since unscrupulous bystanders would not be able to see what exactly has transpired between the smart phone and the smart doorlock, i.e. exactly how many times the camera light units has been flashing, and thus unable to crack the smart doorlock.

Another usage example of the method and system of the embodiment of present invention is for the smart home with an environment modeling center (EMC) multi-sensor module (which is an IoT device), that is configured to detect temperature, humidity, noise, PM2.5, PM10, carbon dioxide concentration . . . and so on, the EMC multi-sensor module would periodically initiate automated detection sessions, and store the collected environmental detection data in an internal memory thereof. The user can then access the stored environmental detection data from the EMC multi-sensor module by first "waking up" the turned-off EMC multi-sensor module using the contactless turn-on method and system of present invention using a smart phone equipped with a camera light source, to conveniently download the collected detection data thereof over a certain period of time, i.e. a day, a week, a month, or a year over to the smart phone Another benefit of the embodiments of present invention includes adding value to an IoT device branding and product distinction by raising or attracting bystander attention when the flashing of the mobile phone camera light source is seen at close proximity of the IoT device, so that invariably bystanders may become curious in learning about the IoT device, thereby raising recognition thereof.

Another benefit of the embodiments of present invention includes the omittance of physical touching of IoT devices by hand for powering on thereof, so that any unsanitary exposure to germs or viruses can be avoided. In other words, the usage of flashing light from the camera light source of the mobile phone replaces the physical touching of the IoT device power on button for powering on of the IoT device as being a cleaner and more sanitary option.

In addition to the illustrated embodiment as previously described above, in which an operating distance for conducting contactless turning on of the IoT device using the mobile phone camera light source is about 50 mm, but alternatively, the operating distance can also be 5 mm to 2 meters. The extending of the operating distance can be achieved by adding a Fresnel lens sheet between the mobile phone camera light source and the IoT device when held by hand, or can be achieved by using a commercially available type of tunable lens module placed on top of the mobile phone camera light source during usage. This tunable lens module can be a sized-down (miniaturized) and cheaper version of Optotune ML-25-50 lens, which offers the ability to focus the light beam to a much smaller spot size, thereby allowing greater operating distance between the mobile phone and the IoT device with the photo sensor unit or light sensor module attached thereon. The extending of the operating distance up to 2 meters allows added advantage of access to harder to reach IoT devices, such as on a ceiling or on an utility pole.

The integration of the commercially-available conventional IoT device into adaptation for proper usage in accordance with the method and system according to embodiment of the present invention can be accomplished by adding a IoT accessory unit which includes a light sensor module (which has a first, second, or third photosensitive circuit according to embodiment of present invention) to be implemented and offered as an aftermarket solution to the consumer. In addition, the integration of an IoT device under new development (which is yet to be offered as a commercial available product) into adaptation for proper usage in accordance with the method and system according to embodiment of the present invention can be accomplished by adding a first, second, or third photosensitive circuit according to embodiment of present invention, so as to provide additional features beyond pre-existing IoT device functionalities. Furthermore, an alternative integration method for an IoT device that has a built-in light sensor, that is equivalent or similar to the first photosensitive circuit or the second photosensitive circuit, and a built-in low-power comparator therein, such as inside the microprocessor, can be successfully adopted for contactless turning on thereof using mobile phone by slightly modifying the app to interact and communicate with the built-in light sensor and the built-in low-power comparator of the IoT device. For IoT device that already have a built-in indicator light, the indicator light 500 can be thereby omitted (in step S4 above) for performing blinking for indicating successful powering-on of the IoT device using the mobile phone. It is to be understood that the invention needs not be limited to the disclosed embodiment for the illuminating pattern of the camera light source. On the contrary, it is intended to cover various modifications for illuminating patterns thereof included within the spirit and scope of the appended claims which are to be accorded with the broadest interpretation so as to encompass all such modifications of illuminating patterns. Thus, the illuminating pattern can be of flashing in various frequencies of any particular count, etc, so as to be included within the spirit and scope of the appended claims.

In the embodiments of present invention, the camera light source 200 can be an LED light source, with or without any additional lens modules or filters thereon, the mobile phone 100 can be a smart phone, or even a wireless tablet device, such as an iPad®.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A contactless IoT device power-on system, comprising:
a mobile phone, the mobile phone is equipped with wireless connection, an app and a camera light source;
a photo sensor unit; and
an IoT device,
wherein the app is configured on the mobile phone for managing communication tasks between the mobile phone and the IoT device, the photo sensor unit is configured on the IoT device, the photo sensor unit comprising a first photosensitive circuit, a second photosensitive circuit or a third photosensitive circuit, the first photosensitive circuit comprising a photodiode, a first resistor, a capacitor, and a voltage comparator; the photodiode directly coupled to the first resistor at an anode thereof, the first resistor is connected to a positive input of the voltage comparator, the cathode of the photodiode is coupled to ground, the negative input of the voltage comparator is connected to a second resistor, which in turn is coupled to ground, and is connected to a third resistor which in turn is coupled to VDD, an output of the voltage comparator has a digital voltage output, the second photosensitive circuit has a photo resistor, and the third photosensitive circuit has an amorphous silicon solar cell, an incident light from the camera light source of the mobile phone is illuminated on the photo sensor unit to power on the IoT device in a contactless manner.

2. The contactless IoT device power-on system as claimed in claim 1, wherein the first photosensitive circuit further comprising a first junction formed between one end of the capacitor, the first resistor and the positive input of the voltage comparator, a second junction formed between the second resistor, the third resistor and the negative input of the voltage comparator.

3. The contactless IoT device power-on system as claimed in claim 2, wherein the incident light from the camera light source is illuminated onto the photodiode, upon which a higher the intensity of the incident light leads to a larger voltage difference at two ends of the photodiode, thus permitting the voltage comparator detecting whether a required power-up voltage difference threshold of the IoT device while being under a turned-off state has been met, whereby upon exceeding the required power-up voltage difference threshold, the IoT device is awaken and powered on.

4. The contactless IoT device power-on system as claimed in claim 1, wherein the first photosensitive circuit has the voltage comparator having power consumption of less than 0.5 uA and a resistive voltage divider circuit operating less than 1 uA, thereby achieving overall current consumption of 1.5 uA or less.

5. The contactless IoT device power-on system as claimed in claim 3, wherein the required power-up voltage difference threshold is about 0.25 volts at a distance of 50 mm between the camera light source and the photodiode.

6. The contactless IoT device power-on system as claimed in claim 1, wherein the third photosensitive circuit comprising an amorphous silicon solar cell, a capacitor, a first resistor, a second resistor, a third resistor, a fourth resistor, and a voltage comparator; the amorphous silicon solar cell is coupled to a first junction at a positive terminal thereof, the first junction is connected to the capacitor and a second junction, the second junction is also coupled to the resistor and a third junction, the capacitor is coupled to ground at one end thereof, the amorphous silicon solar cell is connected to ground at a negative terminal thereof, a fourth junction formed between the first resistor, the second resistor and a negative input of the voltage comparator, a fifth junction formed between the second resistor, ground and a negative supply voltage of the voltage comparator, the third junction is coupled to a voltage input to the IoT device and to a positive supply voltage of the voltage comparator, a sixth junction formed between the voltage output of the IoT device, the digital voltage output of the voltage comparator and the fourth resistor, the fourth resistor coupled to a seventh junction, the seventh junction formed between the third resistor, the fourth resistor and a positive input of the voltage comparator, another end of the third resistor is coupled to a reference voltage REF of the voltage comparator.

7. The contactless IoT device power-on system as claimed in claim 6, wherein the amorphous silicon solar cell generates an amount of electrical energy for the IoT device, so that no battery is needed for turning on the IoT device using the camera light source.

8. A method for turning on an IoT device in a contactless manner using a mobile phone configured with a camera light source and an app configured therein for interacting with the IoT device, comprising of steps of:
 (a) holding the mobile phone with the camera light source being directly pointing at the IoT device and activating the app residing on the mobile phone;
 (b) verifying successful sign in of the end user by the app and powering on the camera light source of the mobile phone for illuminating an incident light;
 (c) configuring a photo sensor unit to be coupled to a power-on circuit of the IoT device and to be disposed on a top surface of the IoT device, detecting an intensity of incident light illuminated upon the photo sensor unit, and assessing whether a voltage difference produced by the incident light exceeds a power-up voltage difference threshold value, and if so, awaking the IoT device to be power-on, otherwise, maintaining the IoT device under a power-off state, flashing the camera light source a set number of times to switch the IoT device to the power-off state upon tearing down of communication sessions between the mobile phone and the IoT device; and
 (d) initiating wireless two-way communication with the IoT device using the mobile phone via the app therein, and switching the IoT device to a power-off state upon completion of usage of the IoT device.

9. The method for turning on the IoT device in the contactless manner as claimed in claim 8, further comprising step (e) between step (c) and step (d): (e) disposing an indicator light on the IoT device, and blinking the indicator light for indicating successful powering-on of the IoT device using the mobile phone.

* * * * *